(12) United States Patent
Gassho et al.

(10) Patent No.: US 7,728,998 B2
(45) Date of Patent: Jun. 1, 2010

(54) PRINTING MANAGEMENT SYSTEM, PRINTING APPARATUS, PRINT INFORMATION OUTPUT APPARATUS, AND PRINTING METHOD

(75) Inventors: Kazuhito Gassho, Nagano (JP); Tadashi Shiozaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1415 days.

(21) Appl. No.: 11/130,407

(22) Filed: May 17, 2005

(65) Prior Publication Data

US 2005/0264841 A1 Dec. 1, 2005

(30) Foreign Application Priority Data

May 17, 2004 (JP) ............................. P2004-146360

(51) Int. Cl.
G06F 3/12 (2006.01)
G06F 7/04 (2006.01)
G09C 3/08 (2006.01)

(52) U.S. Cl. ........................... 358/1.15; 380/51; 726/26
(58) Field of Classification Search ................. None
See application file for complete search history.

(56) References Cited

U.S. PATENT DOCUMENTS

| | | | | |
|---|---|---|---|---|
| 5,577,125 A * | 11/1996 | Salahshour et al. | ........... | 380/54 |
| 5,784,460 A * | 7/1998 | Blumenthal et al. | ........... | 705/51 |
| 6,167,514 A * | 12/2000 | Matsui et al. | ............... | 713/150 |
| 6,542,261 B1 * | 4/2003 | McGraw | ..................... | 358/434 |
| 6,671,726 B1 * | 12/2003 | Hanway | ...................... | 709/227 |
| 6,711,677 B1 * | 3/2004 | Wiegley | ...................... | 713/151 |
| 7,079,291 B2 | 7/2006 | Ichikawa | | |
| 7,173,730 B1 * | 2/2007 | Suzuki et al. | .............. | 358/1.16 |
| 7,224,477 B2 * | 5/2007 | Gassho et al. | .............. | 358/1.14 |
| 7,324,974 B1 * | 1/2008 | Cho et al. | ...................... | 705/51 |
| 7,426,054 B1 * | 9/2008 | Saito | ......................... | 358/1.16 |
| 7,464,144 B2 * | 12/2008 | Hiroshige et al. | .......... | 709/220 |
| 7,475,345 B2 | 1/2009 | Ohara | | |
| 2002/0036789 A1 * | 3/2002 | Iwasaki | ...................... | 358/1.14 |
| 2003/0044009 A1 * | 3/2003 | Dathathraya | ................. | 380/55 |
| 2003/0165240 A1 * | 9/2003 | Bantz et al. | ................... | 380/54 |
| 2004/0049463 A1 * | 3/2004 | Kwon | .......................... | 705/50 |
| 2006/0082808 A1 * | 4/2006 | Borza | ....................... | 358/1.15 |

FOREIGN PATENT DOCUMENTS

| | | | |
|---|---|---|---|
| JP | 5-108445 A | | 4/1993 |
| JP | 11-305968 A | | 11/1999 |
| JP | 2000-35869 A | | 2/2000 |
| JP | 2002-152452 A | | 5/2002 |
| JP | 2002-163094 A | | 6/2002 |
| JP | 2004-78554 A | | 3/2004 |

* cited by examiner

*Primary Examiner*—Mark K Zimmerman
*Assistant Examiner*—Mesfin Getaneh
(74) *Attorney, Agent, or Firm*—Sughrue Mion, PLLC

(57) ABSTRACT

A printing management system includes a plurality of printing apparatus and a client terminal that is connected to the plurality of printing apparatus via a communication line. The client terminal includes an information output unit that outputs print information to a portable storage medium, the print information including print subject location information for identifying a location of at least one print subject to be printed. Each of the plurality of printing apparatus includes an information acquiring unit that acquires the print information from the storage medium, a print subject receiving unit that receives the print subject from the location that is identified by the print subject location information of the acquired print information, and a print executing unit that prints the received print subject.

13 Claims, 3 Drawing Sheets

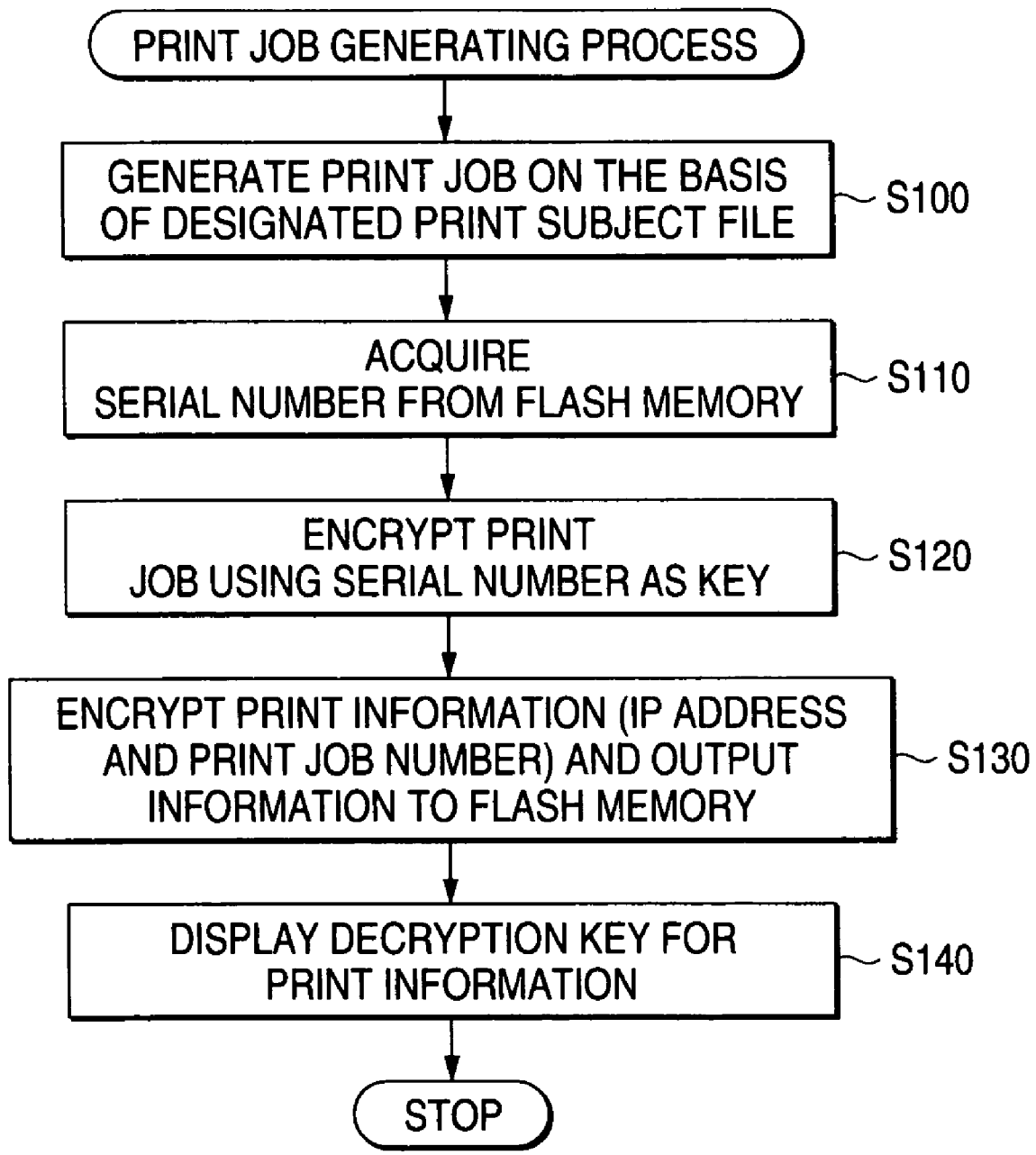

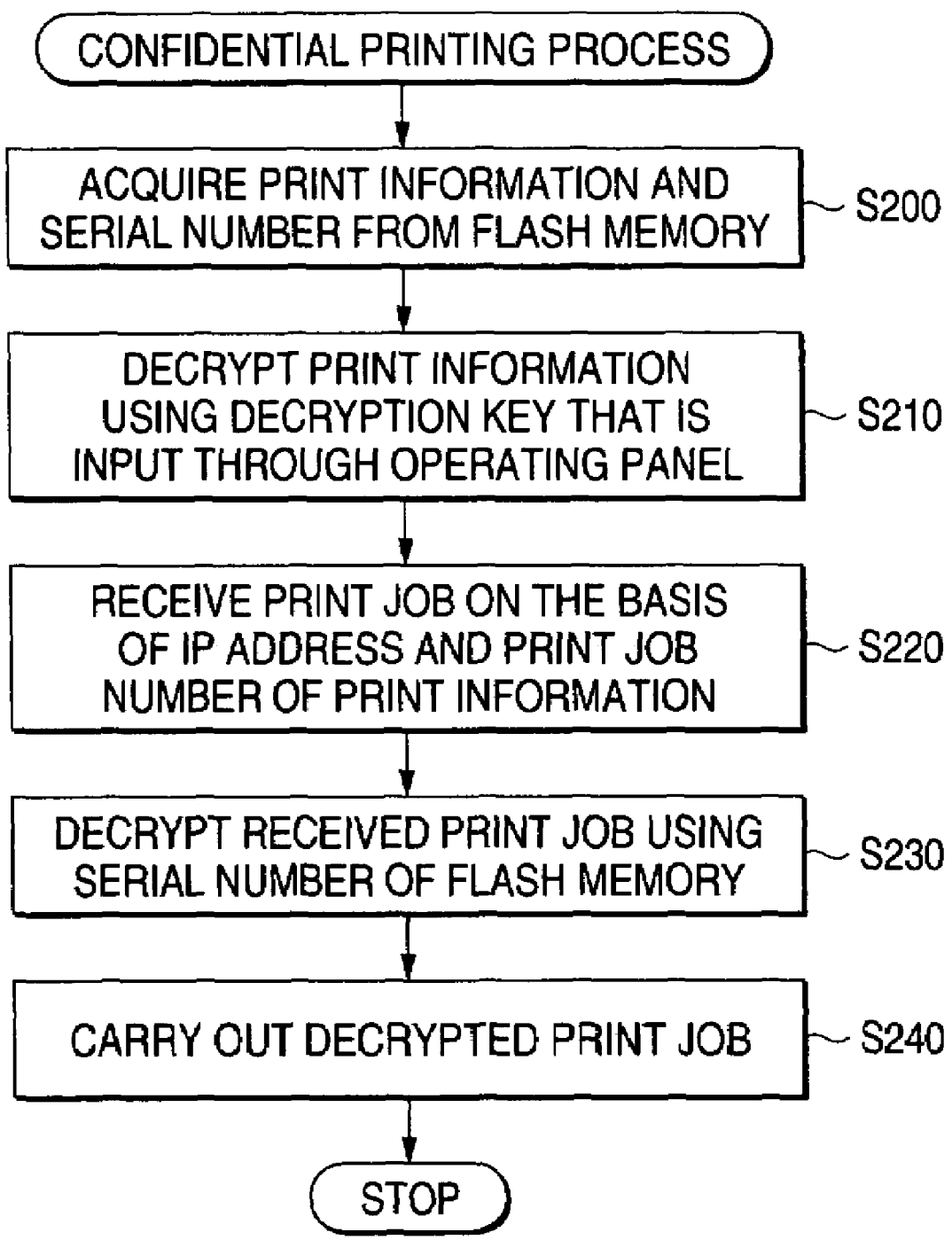

PRINTING MANAGEMENT SYSTEM, PRINTING APPARATUS, PRINT INFORMATION OUTPUT APPARATUS, AND PRINTING METHOD

BACKGROUND OF THE INVENTION

The present invention relates to a printing management system, a printing apparatus and a print information output apparatus used therein, and a printing method used therefor. More specifically, the invention relates to a printing management system provided with plural printing apparatus and a client terminal connected to the plural printing apparatus via a communication line, a printing apparatus and a print information output apparatus used therein, and a printing method used therefor.

Among related printing management systems of the above type is a system that performs confidential printing in which a password is set for a print job to prevent printed matter from being seen by other persons in the case where printers are shared on a network such as a LAN (refer to JP-A-2002-163094, for example). In this system, a password that has been set for a print job is transmitted to a portable terminal of a user and the telephone number of this portable terminal is set for the print job and transmitted to a printer. Then, the user moves to the printer and the telephone number and the password are transmitted from the portable terminal of the user. The printer collates these pieces of information with information (telephone number and password) that is set for the print job and performs printing.

However, in the above system, a print job is held by a printer during a period from the transmission of the print job to the printer to the time point when a user reaches the printer, which is not preferable in terms of secrecy. Further, there may occur a case that it is found after the transmission of a print job to a printer that the use of another printer is favorable (for example, a case that trouble (e.g., toner running out) has occurred in the printer or a case that many standby print jobs exist). However, the above system requires re-transmission of the print job.

SUMMARY OF THE INVENTION

One object of the present invention is to provide a printing management system, a printing apparatus, a print information output apparatus used therein, and a printing method used therefor that make it possible to increase the secrecy of printer matter in confidential printing. Another object of the invention is to provide a printing management system, a printing apparatus, a print information output apparatus used therein, and a printing method used therefor that make it possible to change the output destination printing apparatus more flexibly.

To attain at least part of the above objects, a printing management system, a printing apparatus, a print information output apparatus used therein, and a printing method used therefor according to the invention employ the following unit or steps.

The printing management system according to the invention is summarized as follows: a printing management system, comprising:

a plurality of printing apparatus; and a client terminal that is connected to the plurality of printing apparatus via a communication line, wherein the client terminal includes an information output unit that outputs print information to a portable storage medium, the print information including print subject location information for identifying a location of at least one print subject to be printed; and wherein each of the plurality of printing apparatus includes:

an information acquiring unit that acquires the print information from the storage medium;

a print subject receiving unit that receives the print subject from the location that is identified by the print subject location information of the acquired print information; and a print executing unit that prints the received print subject.

In this printing management system according to the invention, the client terminal outputs, to a portable, prescribed storage medium, print information including print subject location information. A printing apparatus acquires the print information from the portable storage medium, receives a print subject from the location that is identified by the print subject location information of the acquired print information, and prints the received print subject. Therefore, the print subject can be received from the location that is identified by the print subject location information that was output to the portable storage medium, and the received print subject can be printed. That is, since the print job is received after a user has moved to the printing apparatus carrying the prescribed storage medium, the secrecy can be made higher than in the case of transmitting the print job to the printing apparatus in advance and the output destination printing apparatus can be changed more flexibly. The portable, prescribed storage medium may be any of various memory cards and IC cards, an IC tag, a memory that is incorporated in a personal digital assistant or a cell phone, or a like storage medium.

Preferably, the client terminal further includes a print subject storing unit that stores the print subject. The information output unit outputs terminal identification information for identifying the client terminal as the print subject location information. The print subject receiving unit receives the print subject stored in the print subject storing unit of the client terminal that is identified by the terminal identification information. The terminal identification information may be any of various kinds of information that enable identification of the client terminal such as a computer name or an IP address of the client terminal and a MAC address or a LAN board provided in the client terminal.

Preferably, the client terminal includes a print job generating unit that generates a print job to be carried out by a prescribed printing apparatus and that stores the print job in the print subject storing unit as the print subject. Each of the plurality of printing apparatus includes a job generation instructing unit that instructs the client terminal that is identified by the terminal identification information of the print information acquired by the information acquiring unit to generate the print job to be carried out by the printing apparatus and to store the generated print job in the print subject storing unit. The print subject receiving unit receives the print job that has been generated and stored by the print job generating unit in response to an instruction from the job generation instructing unit. In this configuration, it becomes possible to instruct the client terminal to generate a print job that can be carried out by a printing apparatus that has acquired the print information from the prescribed medium, and to receive and perform printing on the print job. This makes it possible to construct a printing management system according to the invention using a plurality of printing apparatus that are different in the kind of executable print job (e.g., different in the executable printer control language).

Preferably, the information output unit outputs print subject identification information for identifying the print subject. The print subject receiving unit receives the print subject that is identified by the print subject identification information from the location identified by the print subject location information. With this configuration, it becomes possible to receive a print subject that is identified by print subject identification information.

Preferably, the print subject is encrypted. The information output unit outputs a print subject decryption key for decrypting the encrypted print subject as part of the print information. Each of the plurality of printing apparatus includes a first print subject decrypting unit that decrypts the print subject received by the print subject receiving unit using the print subject decryption key of the print information acquired by the information acquiring unit. In this configuration, a decryption key of an encrypted print subject can be output to the prescribed storage medium and the print subject can be decrypted by using the decryption key and then printed. This makes it possible to further increase the secrecy of printed matter.

Preferably, the client terminal includes a print subject encrypting unit that acquires medium identification information for identifying the storage medium from the storage medium and that encrypts the print subject so that an encrypted print subject is decrypted by using the acquired medium identification information. The information acquiring unit acquires the medium identification information in addition to the print information from the storage medium. Each of the plurality of printing apparatus includes a second print subject decrypting unit that decrypts the print subject received by the print subject receiving unit using the medium identification information acquired by the information acquiring unit. In the above configuration, a print subject can be encrypted and decrypted by using medium identification information of the prescribed storage medium as a decryption key. This makes it possible to further increase the secrecy of printed matter. Examples of the medium identification information are a serial number of the prescribed storage medium, a serial number of a personal digital assistant incorporating the prescribed storage medium, and a telephone number of a cell phone incorporating the prescribed storage medium.

Preferably, the information output unit encrypts the print information and outputs the encrypted print information to the storage medium. The information output unit displays print information decryption key for decrypting the encrypted print information on a display. Each of the plurality of printing apparatus includes an input accepting unit that accepts input of the print information decryption key and a print information decrypting unit that decrypts the print information acquired by the information acquiring unit using the print information decryption key input through the input accepting unit. In the above configuration, print information to be output to the prescribed storage medium can be encrypted and encrypted print information can be decrypted by using a print information decryption key that is input through the input accepting unit of the printing apparatus. This makes it possible to further increase the secrecy of printed matter.

According to the present invention, there is also provided a printing apparatus for printing characters or an image on a recording medium, comprising:

an information acquiring unit that acquires print information from a portable storage medium that stores the print information, the print information including print subject location information for identifying a location of at least one print subject to be printed;

a print subject receiving unit that receives the print subject from the location identified by the print subject location information of the acquired print information; and a print executing unit that prints the received print subject.

In this printing apparatus according to the invention, print information including print subject location information is acquired from a portable, prescribed storage medium. Also, a print subject is received from a location that is identified by the print subject location information, and the print subject is then printed. Therefore, the print subject can be received from the location that is identified by the print subject location information that was output to the prescribed storage medium, and the received print subject can be printed. That is, since the print job is received after a user has moved to the printing apparatus carrying the prescribed storage medium, the secrecy can be made higher than in the case of transmitting the print job to the printing apparatus in advance and the output destination printing apparatus can be changed more flexibly. The portable, prescribed storage medium may be any of various memory cards and IC cards, an IC tag, a memory that is incorporated in a personal digital assistant or a cell phone, or a like storage medium.

Preferably, the print subject location information is terminal identification information for identifying a client terminal that generates a print job to be carried out by a prescribed printing apparatus as a print subject. The printing apparatus further comprises a job generation instructing unit that instructs the client terminal that is identified by the terminal identification information of the print information acquired by the information acquiring unit to generate the print job to be carried out by the printing apparatus. The print subject receiving unit receives the print job that has been generated by the client terminal in response to an instruction from the job generation instructing unit. In the above configuration, it becomes possible to instruct the client terminal that is identified by terminal identification information to generate an executable print job, and to receive and perform printing on the print job. The terminal identification information may be any of various kinds of information that enable identification of the client terminal such as a computer name or an IP address of the client terminal and a MAC address or a LAN board provided in the client terminal.

Preferably, the print subject is encrypted. The print information is information including a print subject decryption key for decrypting the encrypted print subject. The printing apparatus, further comprises a print subject decrypting unit that decrypts the print subject received by the print subject receiving unit using the print subject decryption key of the print information acquired by the information acquiring unit. In the above configuration, a print subject can be decrypted by using a decryption key acquired from the prescribed storage medium and the decrypted print subject can be printed. This makes it possible to further increase the secrecy of printed matter.

Preferably, the print information is encrypted. The printing apparatus further comprises an input accepting unit that accepts input of print information decryption key for decrypting the encrypted print information, and a print information decrypting unit that decrypts the print information acquired by the information acquiring unit using the print information decryption key that has been input through the input accepting unit. In the above configuration, print information can be decrypted by using a print information decryption key that is input through the input accepting unit. This makes it possible to further increase the secrecy of printed matter.

According to the present invention, there is also provided a print information output apparatus for outputting information to be used for printing, comprising:

an information output unit that outputs print information to a portable storage medium, the print information including print subject location information for identifying a location of at least one print subject to be printed.

In this print information output apparatus according to the invention, print information including print subject location information is output to a portable, prescribed storage medium. This makes it possible to output the print subject location information to the prescribed storage medium so that the print subject location information can be utilized by a user.

Preferably, The print information output apparatus further comprises a first print subject encrypting unit that encrypts the print subject. The information output unit outputs a print subject decryption key for decrypting the encrypted print subject as part of the print information. In the above configuration, it becomes possible to encrypt a print subject and to output a decryption key for the print subject to the prescribed storage medium. This makes it possible to further increase the secrecy of printed matter.

Preferably, the print information output apparatus further comprises a second print subject encrypting unit that acquires medium identification information for identifying the portable storage medium from the portable storage medium and that encrypts the print subject so that the encrypted print subject is decrypted by using the acquired medium identification information. In the above configuration, a print subject can be encrypted by using medium identification information of the prescribed storage medium as a decryption key. This makes it possible to further increase the secrecy of printed matter. Examples of the medium identification information are a serial number of the prescribed storage medium, a serial number of a personal digital assistant incorporating the prescribed storage medium, and a telephone number of a cell phone incorporating the prescribed storage medium.

The program for a print information output apparatus according to the invention is summarized as follows: a program for causing a computer to function as the print information output apparatus according to the invention of any of the above forms, that is, basically, the print information output apparatus for outputting information to be used for printing, comprising an information output unit for outputting, to a portable, prescribed storage medium, print information including print subject location information that enables identification of a location of at least one print subject to be printed.

In this print information output apparatus according to the invention, a computer is caused to function as the print information output apparatus according to the invention of any of the above forms. Therefore, the program provides the same advantages as provided by the print information output apparatus according to the invention; for example, print subject location information is output to a prescribed storage medium and a user is allowed to utilize it, and the secrecy of printed matter can further be increased.

According to the present invention, there is also provided a printing method for performing printing by using a plurality of printing apparatus and a client terminal connected to the plurality of printing apparatus via a communication line, the printing method comprising:

outputting print information to a portable storage medium, the print information including print subject location information for identifying a location of at least one print subject to be printed;

acquiring the print information from the portable storage medium;

receiving the print subject from the location identified by the print subject location information of the acquired print information; and printing the received print subject.

Preferably, the print subject is encrypted. The printing method, further comprises outputting a print subject decryption key for decrypting the encrypted print subject as a part of the print information, and decrypting the print subject received in the receiving process by using the print subject decryption key of the print information.

Preferably, the printing method further comprises acquiring medium identification information for identifying the storage medium from the storage medium, encrypting the print subject so that an encrypted print subject is decrypted by using the acquired medium identification information, acquiring the medium identification information in addition to the print information from the storage medium, and decrypting the print subject received in the receiving process by using the medium identification information acquired in the acquiring process.

Preferably, the outputting process includes encrypting the print information, and outputting the encrypted print information to the storage medium. The printing method, further comprises displaying print information decryption key for decrypting the encrypted print information on a display, accepting input of the print information decryption key, and decrypting the print information acquired in the acquiring process by using the print information decryption key inputted in the accepting process.

In this printing method according to the invention, the client terminal outputs print information including print subject location information to a portable, prescribed storage medium. A printing apparatus acquires the print information from the prescribed storage medium, receives a print subject from a location that is identified by the print subject location information of the acquired print information, and prints the received print subject. Therefore, the print subject can be received from the location that is identified by the print subject location information that was output to the prescribed storage medium, and the received print subject can be printed. That is, since the print job is received after a user has moved to the printing apparatus carrying the prescribed storage medium, the secrecy can be made higher than in the case of transmitting the print job to the printing apparatus in advance and the output destination printing apparatus can be changed more flexibly. The portable storage medium may be any of various memory cards and IC cards, an IC tag, a memory that is incorporated in a personal digital assistant or a cell phone, or a like storage medium.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a flowchart of an exemplary print job generating process; and

FIG. 3 is a flowchart of an exemplary confidential printing process.

DETAILED DESCRIPTION OF THE PREFERRED EMBODIMENTS

Figure 1:
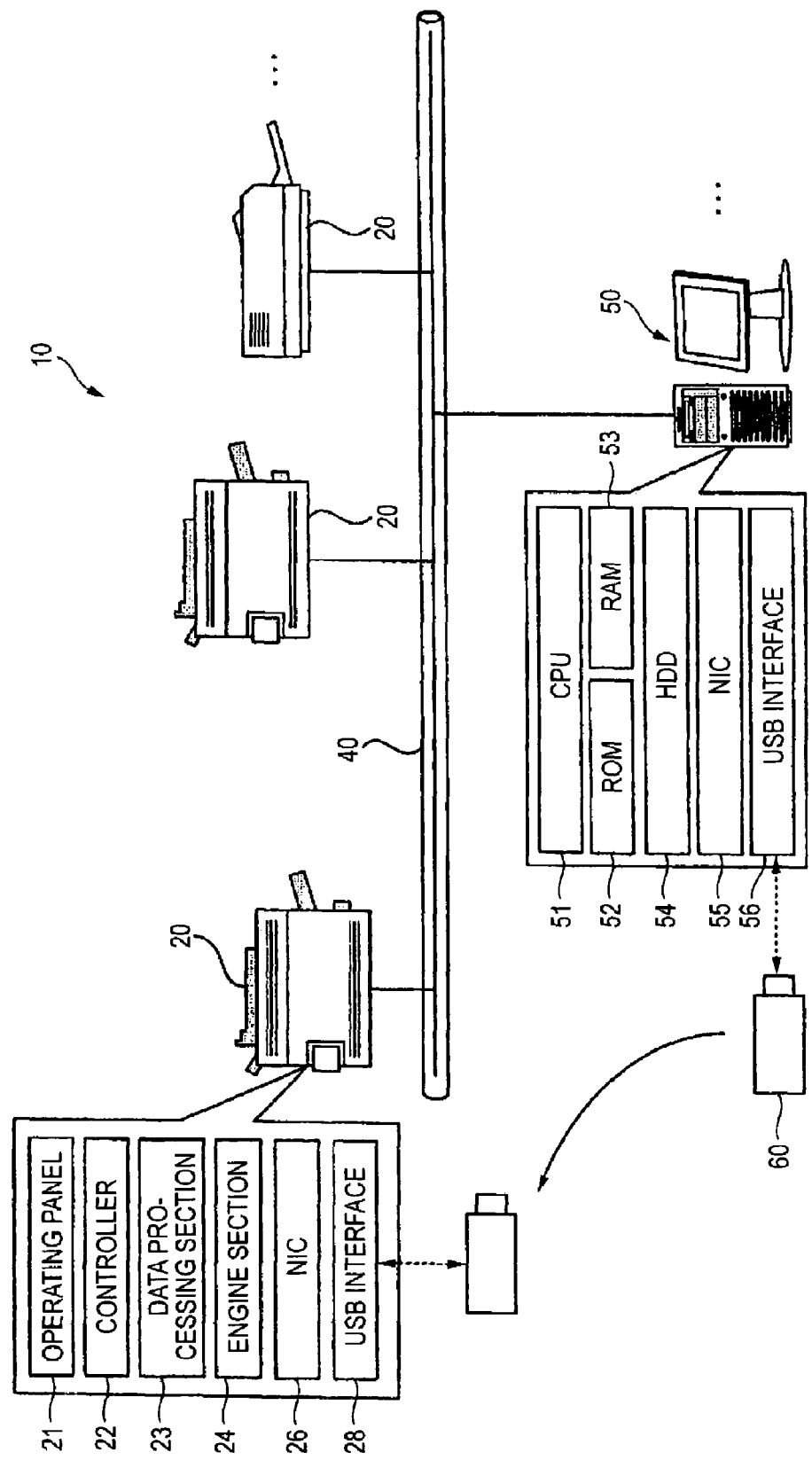
FIG. 1 is a schematic diagram showing the configuration of a printing management system.

The best mode for carrying out the invention will be hereinafter described by using an embodiment.

FIG. 1 is a schematic diagram showing the configuration of a printing management system 10 according to an embodiment of the invention. As shown in FIG. 1, the printing management system 10 is composed of plural printers 20 that function as printing apparatus according to the invention and a client terminal 50 connected to the individual printers 20 via a LAN 40. A print job generated by the client terminal 50 is done (i.e., printing is performed) by each printer 20.

As shown in FIG. 1, each printer 20, which is a general, electrophotographic laser printer, is equipped with an operating panel 21 to be manipulated by a user, a controller 22 for controlling the entire printer 20, a data processing section 23 for performing various kinds of data processing (e.g., analyzing a print job coming from the client terminal 50 or the like and converting it to data in a printable form), an engine 24 for forming characters or an image on a sheet or the like on the basis of the data in a printable form, a network interface card (NIC) 26 for controlling access to the network, and a USB interface 28 for controlling access to a USB-compatible device such as a flash memory 60.

As shown in FIG. 1, the client terminal 50 is a general-purpose computer that is mainly composed of a CPU 51, a ROM 52, and a RAM 53. The client terminal 50 is additionally equipped with a hard disk drive (HDD) 54 for storing data, an NIC 55 for controlling access to the network, a USB interface 56 for controlling access to a USB-compatible device, and other components. Printer drivers that allow the client terminal 50 to be compatible with the individual printers 20 are installed in the HDD 54, whereby the client terminal 50 can generate a print job that can be done by each printer 20.

Next, operations of the above-configured printing management system 10, in particular, an operation of confidential printing that is performed so as to prevent printed matter from being seen by other persons, will be described. An operation that the client terminal 50 generates a print job will be described first, and then an operation that a printer 20 carries out the print job will be described. FIG. 2 is a flowchart of an exemplary print job generating process that is executed by the CPU 51 of the client terminal 50. This process is executed when a user at the client terminal 50 has made a confidential printing instruction.

In the print job generating process, first, as shown in FIG. 2, processing of generating a print job on the basis of a file (document file, image file, or the like) that has been designated as a print subject (step S100). This processing of generating a print job is the same as processing as performed by a general printer driver and is not an important part of the invention. Therefore, no more detailed description of this processing will be made. The generated print job is spooled in a prescribed area of the HDD 54.

Then, a serial number of the flash memory 60 that is mounted in the USB interface 56 is acquired from the flash memory 60 (step S110). The print job that was generated at step S110 is encrypted by using the serial number as an encryption key (step S120). In the embodiment, the print job is encrypted according to common key cryptography in which the same key is used for encryption and decryption.

A print job number for identification of the print job and an IP address of the client terminal 50 are encrypted and output to the flash memory 60 as print information (step S130). A decryption key for the encrypted print information is displayed on the monitor of the client terminal 50 (step S140), and the print job generating process is finished. In encrypting the print information, any of various kinds of cryptography can be used such as common key cryptography (mentioned above) and public key cryptography in which different keys are used for encryption and decryption.

Next, an operation that a printer 20 carries out the print job will be described. FIG. 3 is a flowchart of an exemplary confidential printing process that is executed by the controller 22 of a printer 20. This process is executed when the flash memory 60 in which the above-mentioned print information is stored is attached to the USB interface 28 of a printer 20. In the confidential printing process, first, as shown in FIG. 3, the print information and the serial number of the flash memory 60 are acquired from the attached flash memory 60 (step S200). The acquired print information is decrypted by using a decryption key that is input through the operating panel 21 (step S210). The decryption key for the print information is the one that was displayed on the monitor of the client terminal 50 at step S140 of the above-described print job generating process. That is, the user takes notes of the decryption key or does a like act in advance when it is displayed on the monitor of the client terminal 50 and inputs the decryption key through the operating panel 21.

The printer 20 receives the print job that is identified by the print job number of the decrypted print information among print jobs spooled in the HDD 54 of the client terminal 50 that is identified by the IP address of the decrypted print information (step S220). The received print job is decrypted by using, as a decryption key, the serial number of the flash memory 60 (step S230). As described above, since the print job was encrypted according to the common key cryptography in which the serial number of the flash memory 60 was used as a key, the print job can be decrypted by using, as a decryption key, the serial number of the flash memory 60.

After the print job has been decrypted in this manner, the decrypted print job is carried out (i.e., printing is performed) (step S240) and the confidential printing process is finished. The print job is carried out in such a manner that the data processing section 23 analyzes the print job and converts it into data having a printable format and the engine 24 forms characters or an image on a sheet or the like on the basis of the data having the printable format. This processing is the same as processing as performed by a general laser printer and is not an important part of the invention. Therefore, no more detailed description of this processing will be made.

In the above-described printing management system 10 according to the embodiment, the client terminal 50 outputs a print job number of a generated print job and an IP address of the client terminal 50 to the flash memory 60 as print information. When attached with the flash memory 60, a printer 20 can acquire the print information from the flash memory 60 and receive and perform printing on the print job that is identified by the print job number of the print information among print jobs spooled in the HDD 54 of the client terminal 50 that is identified by the IP address of the print information. That is, since the print job is received after the user has moved to the printer 20 carrying the flash memory 60, the secrecy can be made higher than in the case of transmitting the print job to the printer 20 in advance and the output destination printer 20 can be changed more flexibly. Further, since the generated print job can be encrypted by using the serial number of the flash memory 60 and the print information can be output to the flash memory 60 after encrypting it, the secrecy of printer matter can be increased further.

In each printer 20 according to the embodiment, the controller 22 which executes step S200 corresponds to an information acquiring unit, the operating panel 21 corresponds to an input accepting unit, the controller 22 which executes step S210 corresponds to a print information decrypting unit, the controller 22 which executes step S220 corresponds to a print subject receiving unit, the controller 22 which executes step S230 corresponds to a second print subject decrypting unit, and the controller 22 which executes step S240 corresponds to a print executing unit. In the client terminal 50 according to the embodiment, the HDD 54 corresponds to a print subject storing unit, the CPU 51 which executes step S100 corresponds to a print job generating unit, the CPU 51 which executes steps S110 and 120 corresponds to a print subject encrypting unit, and the CPU 51 which executes steps S130 and 140 corresponds to an information output unit. In the embodiment, the print job corresponds to a print subject, the print job number corresponds to a print subject identification number, the IP address of the client terminal 50 corresponds to terminal identification information (print subject location information), the flash memory 60 corresponds to a portable storage medium, and the serial number of the flash memory 60 corresponds to medium identification information. The client terminal 50 of the embodiment corresponds to a print information output apparatus according to the invention.

In the printing management system 10 according to the embodiment, the IP address is used as an example of information to be used for identifying the client terminal 50. The information to be used for identifying the client terminal 50 can be any information that enables identification of the client terminal 50 as a print job location and, for example, may be such information as a computer name of the client terminal 50 or a MAC address of the NIC 55.

In the printing management system 10 according to the embodiment, a generated print job is spooled in the HDD 54 of the client terminal 50. However, it may be spooled in, for example, a server other than the client terminal 50. In this case, it is appropriate to use, as an IP address of print information, an IP address of a server in which a print job has been spooled.

In the printing management system 10 according to the embodiment, a print job that is identified by the print job number of print information among print jobs spooled in the HDD 54 of the client terminal 50 that is identified by an IP address is received. However, it is not indispensable to output the print job number as part of the print information. In this case, it is appropriate to receive all the print jobs spooled in the HDD 54 of the client terminal 50 that is identified by the IP address.

In the printing management system 10 according to the embodiment, a print job that is spooled in the HDD 54 of the client terminal 50 that is identified by an IP address is received and subjected to printing. However, it is not indispensable to identify a print job as a print subject. For example, a print subject file (document file, image file, or the like) that is stored in a prescribed area of the HDD 54 may be received and subjected to printing. In this case, an appropriate procedure is as follows. A printer 20 that has received a print subject file performs processing of generating a print job or instructs the client terminal 50 to generate a print job that can be carried out by the printer 20 and receives a print job that has been generated in response to the instruction. This makes it possible to construct a printing management system 10 according to the invention by using plural printers 20 that are different in the kind of executable print job (e.g., different in the executable printer control language).

In the printing management system 10 according to the embodiment, a print job is encrypted by using the serial number of the flash memory 60 as an encryption key. It is not indispensable to use the serial number of the flash memory 60. For example, a proper character string may be used as an encryption key or a decryption key. In this case, an appropriate procedure is as follows. The client terminal 50 outputs a decryption key to the flash memory 60 as part of print information and a printer 20 decrypts a received print job using the decryption key. Further, the encryption of a print job may be omitted.

In the printing management system 10 according to the embodiment, print information is output to the flash memory after being encrypted. However, the encryption of print information may be omitted.

In the printing management system 10 according to the embodiment, the flash memory 60 is used as an example of a storage medium to which print information is output. However, the storage medium to which print information is output may be any portable storage medium such as any of various memory cards and IC cards, an IC tag, or a memory that is incorporated in a personal digital assistant or a cell phone. In this case, it is appropriate to provide each printer 20 and the client terminal 50 with an interface that enables data exchange with such a storage medium.

In the printing management system 10 according to the embodiment, each printer 20 is a general electrophotographic laser printer. It goes without saying that each printer 20 may be a printer employing any of other various printing methods such as an ink-jet printer.

Although the embodiment is directed to the printing management system 10, the invention can likewise be expressed as a printing method that performs printing using the client terminal 50 and the printers 20. The invention can also be expressed as a program for a print information output apparatus that causes a single or plural computers to execute the print job generating process exemplified in FIG. 2.

The best mode for carrying out the invention has been described above by using the embodiment. However, the invention is not limited to this embodiment and can naturally be practiced in various forms without departing from the spirit and scope of the invention.

The present application is based on Japan Patent Application No. 2004-146360 filed on May 17, 2004, the contents of which are incorporated herein for reference.

What is claimed is:

1. A printing management system, comprising:
a plurality of printing apparatus; and
a client terminal that is connected to the plurality of printing apparatus via a communication line,
wherein the client terminal includes an information output unit that outputs print information to a portable storage medium, the print information including print subject location information for identifying a location of at least one print subject to be printed; and
wherein each of the plurality of printing apparatus includes:
an information acquiring unit that acquires the print information from the storage medium;
a print subject receiving unit that receives the print subject from the location that is identified by the print subject location information of the acquired print information; and
a print executing unit that prints the received print subject, wherein the client terminal includes a print subject encrypting unit that acquires medium identification information for identifying the storage medium from the storage medium and that encrypts the print subject so that an encrypted print subject is decrypted by using the acquired medium identification information;

wherein the information acquiring unit acquires the medium identification information in addition to the print information from the storage medium;

wherein each of the plurality of printing apparatus includes a first print subject decrypting unit that decrypts the print subject received by the print subject receiving unit using the medium identification information acquired by the information acquiring unit;

wherein the information output unit encrypts the print information and outputs the encrypted print information to the storage medium;

wherein the information output unit displays a print information decryption key for decrypting the encrypted print information on a display; and wherein each of the plurality of printing apparatus includes an input accepting unit that accepts input of the print information decryption key and a print information decrypting unit that decrypts the print information acquired by the information acquiring unit using the print information decryption key input through the input accepting unit.

2. The printing management system according to claim 1, wherein the client terminal further includes a print subject storing unit that stores the print subject;

wherein the information output unit outputs terminal identification information for identifying the client terminal as the print subject location information; and wherein the print subject receiving unit receives the print subject stored in the print subject storing unit of the client terminal that is identified by the terminal identification information.

3. The printing management system according to claim 2, wherein the client terminal includes a print job generating unit that generates a print job to be carried out by a prescribed printing apparatus and that stores the print job in the print subject storing unit as the print subject;

wherein each of the plurality of printing apparatus includes a job generation instructing unit that instructs the client terminal that is identified by the terminal identification information of the print information acquired by the information acquiring unit to generate the print job to be carried out by the printing apparatus and to store the generated print job in the print subject storing unit; and wherein the print subject receiving unit receives the print job that has been generated and stored by the print job generating unit in response to an instruction from the job generation instructing unit.

4. The printing management system according to claim 1, wherein the information output unit outputs print subject identification information for identifying the print subject; and wherein the print subject receiving unit receives the print subject that is identified by the print subject identification information from the location identified by the print subject location information.

5. The printing management system according to claim 1, wherein the print subject is encrypted;

wherein the information output unit outputs a print subject decryption key for decrypting the encrypted print subject as part of the print information; and wherein each of the plurality of printing apparatus includes a second print subject decrypting unit that decrypts the print subject received by the print subject receiving unit using the print subject decryption key of the print information acquired by the information acquiring unit.

6. A printing apparatus for printing characters or an image on a recording medium, comprising:

an information acquiring unit that acquires print information from a portable storage medium that stores the print information, the print information including print subject location information for identifying a location of at least one print subject to be printed;

a print subject receiving unit that receives the print subject from the location identified by the print subject location information of the acquired print information; and a print executing unit that prints the received print subject, wherein a print subject encrypting unit of a client terminal connected to the printing apparatus acquires medium identification information for identifying the storage medium from the storage medium and that encrypts the print subject so that an encrypted print subject is decrypted by using the acquired medium identification information;

wherein the information acquiring unit acquires the medium identification information in addition to the print information from the storage medium;

wherein the printing apparatus includes a first print subject decrypting unit that decrypts the print subject received by the print subject receiving unit using the medium identification information acquired by the information acquiring unit;

wherein an information output unit of the client terminal encrypts the print information and outputs the encrypted print information to the storage medium;

wherein the information output unit displays a print information decryption key for decrypting the encrypted print information on a display; and wherein the printing apparatus flirt her includes an input accepting unit that accepts input of the print information decryption key and a print information decrypting unit that decrypts the print information acquired by the information acquiring unit using the print information decryption key input through the input accepting unit.

7. The printing apparatus according to claim 6, wherein the print subject location information is terminal identification information for identifying a client terminal that generates a print job to be carried out by a prescribed printing apparatus as a print subject;

the printing apparatus, further comprises a job generation instructing unit that instructs the client terminal that is identified by the terminal identification information of the print information acquired by the information acquiring unit to generate the print job to be carried out by the printing apparatus, and wherein the print subject receiving unit receives the print job that has been generated by the client terminal in response to an instruction from the job generation instructing unit.

8. The printing apparatus according to claim 6, wherein the print subject is encrypted;

wherein the print information is information including a print subject decryption key for decrypting the encrypted print subject; and the printing apparatus, further comprises a second print subject decrypting unit that decrypts the print subject received by the print subject receiving unit using the print subject decryption key of the print information acquired by the information acquiring unit.

9. The printing apparatus according to claim 6, wherein the print information is encrypted, the printing apparatus, further comprising:
an input accepting unit that accepts input of print information decryption key for decrypting the encrypted print information; and
a print information decrypting unit that decrypts the print information acquired by the information acquiring unit using the print information decryption key that has been input through the input accepting unit.

10. A print information output apparatus for outputting information to be used for printing, comprising:
an information output unit that outputs print information to a portable storage medium, the print information including print subject location information for identifying a location of at least one print subject to be printed,
a first print subject encrypting unit that acquires medium identification information for identifying the portable storage medium from the portable storage medium and that encrypts the print subject so that the encrypted print subject is decrypted by using the acquired medium identification information;
wherein the information output unit encrypts the print information and outputs the encrypted print information to the portable storage medium;
wherein the information output unit displays a print information decryption key for decrypting the encrypted print information on a display; and
wherein a printing apparatus to be used for the printing includes an information acquiring unit that acquires the print information from the portable storage medium, an input accepting unit that accepts input of the print information decryption key and a print information decrypting unit that decrypts the print information acquired by the information acquiring unit using the print information decryption key input through the input accepting unit.

11. The print information output apparatus according to claim 10, further comprising a second print subject encrypting unit that encrypts the print subject,
wherein the information output unit outputs a print subject decryption key for decrypting the encrypted print subject as part of the print information.

12. A printing method for performing printing by using a plurality of printing apparatus and a client terminal connected to the plurality of printing apparatus via a communication line, the printing method comprising:
outputting print information to a portable storage medium, the print information including print subject location information for identifying a location of at least one print subject to be printed;
acquiring the print information from the portable storage medium;
receiving the print subject from the location identified by the print subject location information of the acquired print information; and
printing the received print subject,
the method further comprising:
acquiring medium identification information for identifying the storage medium from the storage medium;
encrypting the print subject so that an encrypted print subject is decrypted by using the acquired medium identification information;
acquiring the medium identification information in addition to the print information from the storage medium; and
decrypting the print subject received in the receiving process by using the medium identification information acquired in the acquiring process;
wherein the outputting process includes:
encrypting the print information; and
outputting the encrypted print information to the storage medium; and
wherein the printing method, further comprises:
displaying a print information decryption key for decrypting the encrypted print information on a display;
accepting input of the print information decryption key; and
decrypting the print information acquired in the acquiring process by using the print information decryption key inputted in the accepting process.

13. The printing method according to claim 12, wherein the print subject is encrypted; and
wherein the printing method, further comprises:
outputting a print subject decryption key for decrypting the encrypted print subject as a part of the print information; and
decrypting the print subject received in the receiving process by using the print subject decryption key of the print information.

* * * * *